United States Patent [19]
Young

[11] Patent Number: 5,290,008
[45] Date of Patent: Mar. 1, 1994

[54] DISCHARGE CONTROLLING DEVICE FOR FAUCETS

[76] Inventor: Andy Y. Young, 1598 Loch Lomond Land, San Jose, Calif. 95129-3737

[21] Appl. No.: 69,523

[22] Filed: Jun. 1, 1993

[51] Int. Cl.$^5$ ............................................. F16K 31/44
[52] U.S. Cl. ..................... 251/99; 137/901; 251/247; 251/339
[58] Field of Search .................. 137/801, 901; 251/98, 251/99, 247, 339

[56] References Cited

U.S. PATENT DOCUMENTS

| | | | |
|---|---|---|---|
| 10,082 | 10/1853 | Wright | 137/901 X |
| 576,068 | 1/1897 | O'Lally | 251/339 X |
| 1,643,370 | 9/1927 | Brannen | 251/247 X |
| 2,128,627 | 8/1938 | Vogt | 137/901 X |

*Primary Examiner*—Robert G. Nilson
*Attorney, Agent, or Firm*—Scully, Scott, Murphy & Presser

[57] ABSTRACT

This invention is directed to a discharge controlling device for faucet, characterized in that a control lever is used to push a throttle pin axially positioned within the center of the housing, such that the pin is slidably moved up and down and engages a steel ball which is designed to control the opening and closing of a water discharge aperture. As the control lever is pushed by hand and moved from its lowest closed position to the intermediate, open position where the water can be admitted, the steel ball is pushed away from the aperture by the rod tip of the throttle pin which rises axially. At this instant, water enters through the aperture and flows out of the housing. When the hand is released from the control lever, the throttle pin will fall, and the steel ball, which is subject to water pressure, will immediately return to the position where it closes the aperture. As the control lever is moved manually from its lowest closed position to its fixed open position where it engages the locking slot, the control lever will be secured within the locking slot, and due to the locking effect of the slot, the aperture is kept open to allow continuous water flow even the hand is released. As the control lever disengages from the locking slot, the throttle pin drops and the steel ball, due to the action of water pressure, closes the aperture.

4 Claims, 3 Drawing Sheets

DISCHARGE CONTROLLING DEVICE FOR FAUCETS

BACKGROUND OF THE INVENTION

This invention is directed to a discharge controlling device for faucet which makes use of a control lever to drive a throttle pin axially positioned within the center of the housing to slide up and down, so as to control a steel ball to actuate the opening and closing of an aperture, thereby controlling the discharging of the water.

Water saving is a common and important issue. It has been a problem commonly found in household lavatory and public lavatory since the water discharge from the faucets cannot be controlled effectively. Conventional faucets are only capable of adjusting the amount of water discharge, but are not capable of stopping the water flow automatically as soon as the hand moves away from the water outlets. It is a common phenomenon in public lavatory that the faucets fail to lock tightly resulting in a great amount of water wasted. To overcome the above-mentioned problems found in household and public lavatories, it is thus necessary to provide a device which may stop the water flow automatically so as to achieve the purpose of water saving.

SUMMARY OF THE INVENTION

The object of the present invention is to provide a device which is capable of controlling the water discharge from a faucet. In use, as the control lever is actuated by the finger, water will flow out. As the hand leaves the control lever, water flow will be stopped instantly so that the purpose of water-saving is achieved. However, if it is necessary to use water continuously, the control lever may be moved to lock in the locking slot. In this position, even if the hand is released from the control lever, there will be a continuous water flow since the control lever is being locked. As the control lever is disengaged from the locking slot by hand, the water flow will be stopped instantly. Therefore, the problems as mentioned above can be solved by such a discharge controlling device for faucet.

BRIEF DESCRIPTION OF THE DRAWINGS

The invention will be more apparent with reference to the following descriptions in conjunction with the accompanying drawings, wherein.

DETAILED DESCRIPTION OF THE INVENTION

Figure 1:
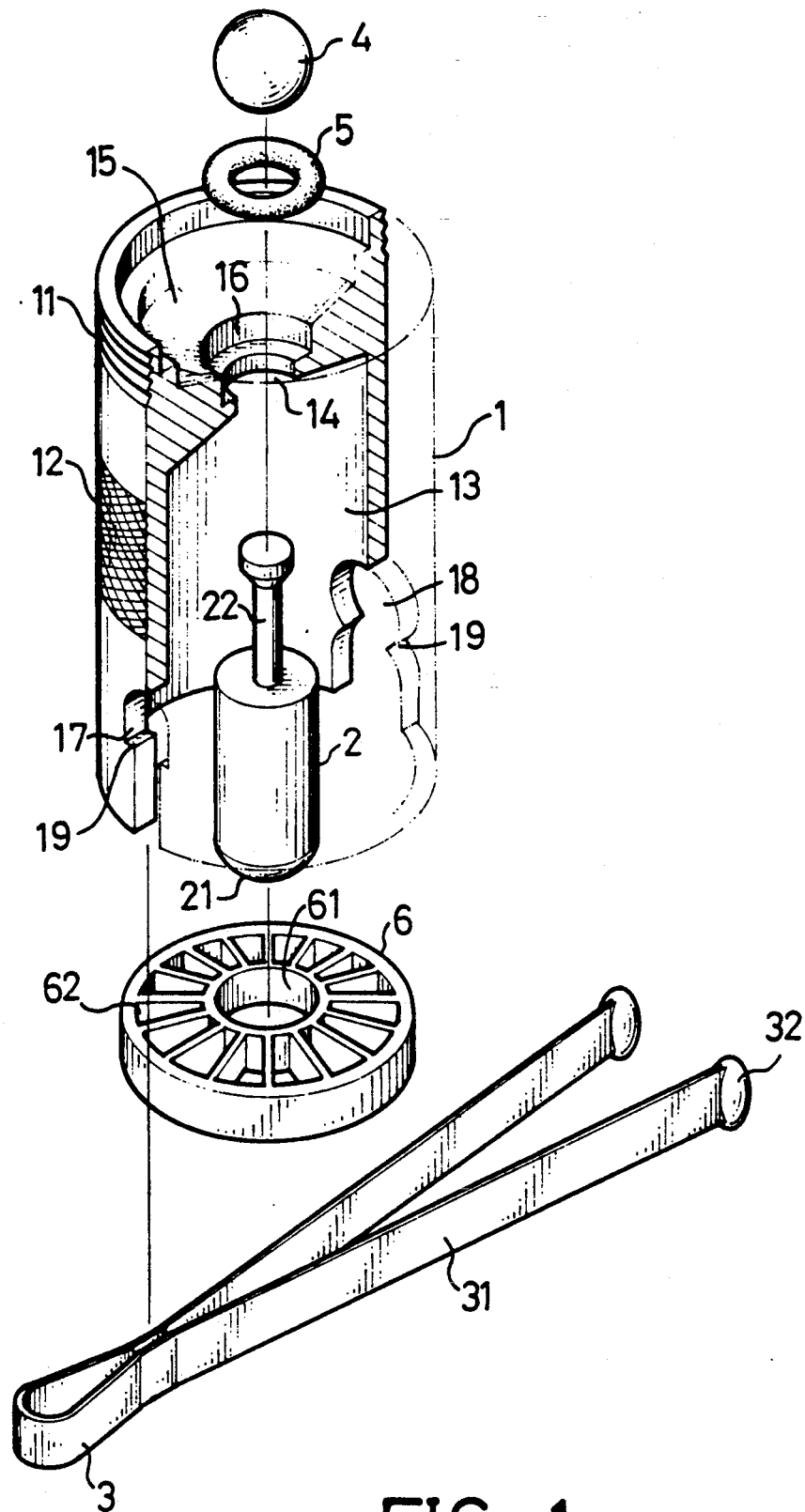
FIG. 1 is an exploded view of the invention in which a portion is removed to show the internal construction of the housing.

With reference to FIG. 1, the discharge controlling device for a faucet in accordance with the invention comprises a housing (1), a throttle pin (2), a control lever (3), a steel ball (4), a seal ring (5) and a diffusion ring (6). The housing (1) is substantially cylindrical in shape with the upper end thereof threaded to form the threaded edge (11) which is adapted for engagement with the faucet outlet. The intermediate portion of the housing is the embossed portion (12) to facilitate hand gripping. The interior of the housing (1) is formed of a space (13) open at one end. The space (13) is defined at the upper end by a partition (15) having a central aperture (14). The aperture (14) is stepped in configuration to form a recessed annular groove (16). The partition (15) is positioned slantingly to aid in guiding the water flow. A pair of locking slots (17) and (18) are provided at the lower edge of the housing (1), at two locations opposite to each other. Each of the slots includes a stop neck (19). The throttle pin (2) includes a cylindrical body which is shaped to be a spherical surface (21) at the lower -end, and which extends from the upper end to form an elongated rod tip (22). The control lever (3) is essentially a flexible spring plate. The forked double spring plate (31) is open at normal ,condition, and includes a head (32) at each of the end portions. Such a configuration is advantageous in closing the double spring plate (31) and also tends to provide a locking effect. The diffusion ring (6) is adapted to fastening and includes a central opening (61) and a plurality of peripheral diffusion holes (62).

To effect assembly (FIGS. 1 and 2), the seal ring (5) is secured within the recessed annular groove (16) located at the periphery of the housing aperture (14). The steel ball (4) is positioned atop the aperture (14) and engages the seal ring (5). The diffusion ring (6) is placed within the interior space (13) of the housing (1) such that the lower edge thereof is above the upper edges of the locking slots (17, 18). The throttle pin (2) is then penetrated through the central opening (61) of the diffusion ring (6). The control lever (3) is locked with one end thereof secured within the neck (10) of the locking slot (17), and the other end thereof is secured within the other locking slot (18) such that the lever (3) will not move out of position. The throttle pin (2) is then carried by the control lever (3) and positioned in place (see FIG. 2) . The assembled controlling device is screwed onto the outlet pipe (7) of the faucet by means of the threaded portion (11) located at the upper peripheral of the housing (1), thereby forming a practicable discharge controlling device for a faucet.

Figure 2:
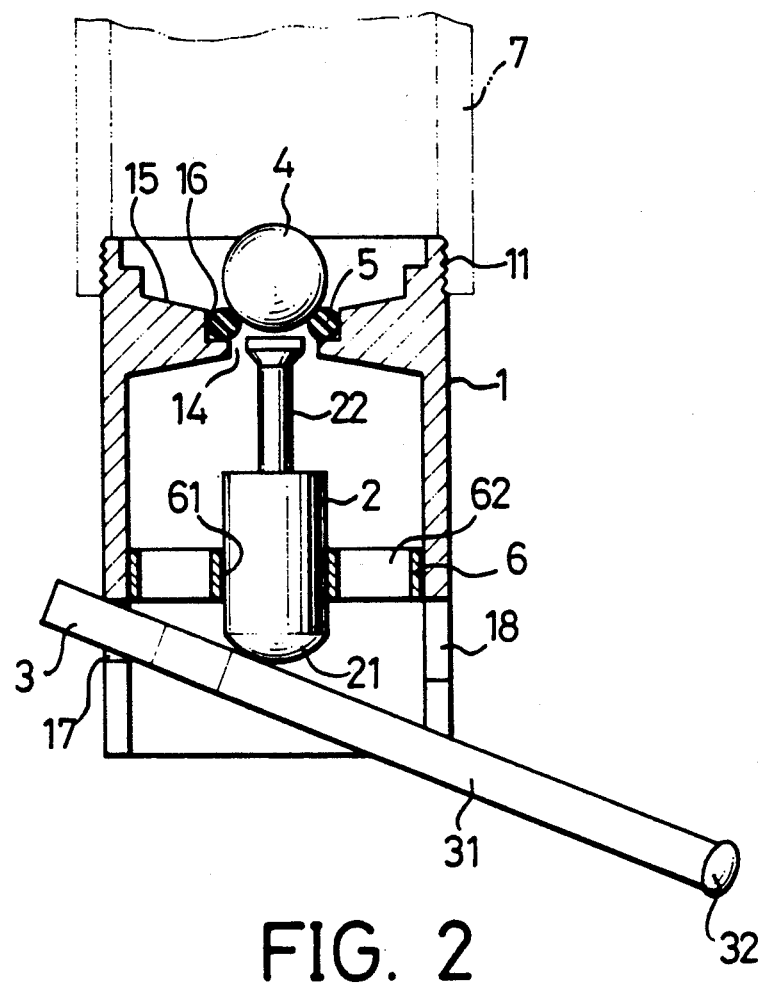
FIG. 2 is a cross-sectional view of the invention in its closed position where the water is stopped from flowing.
Figure 3:
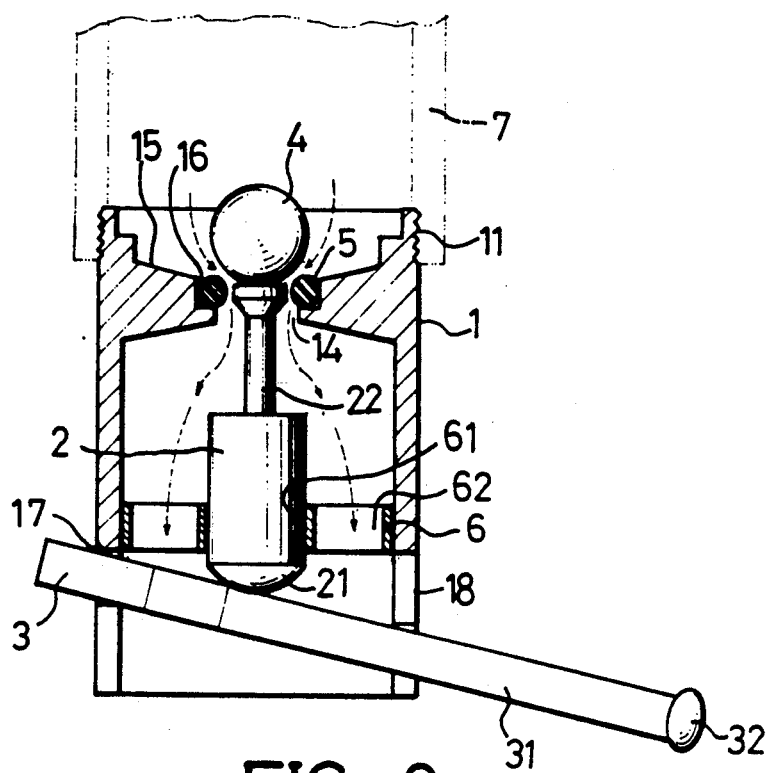
FIG. 3 is a cross-sectional view of the invention in its open position where the water can be admitted.
Figure 4:
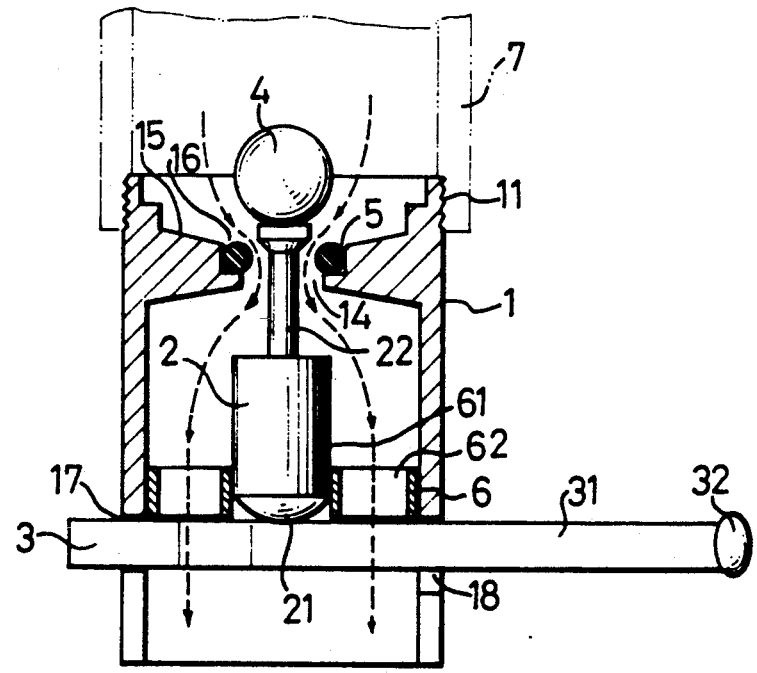
FIG. 4 is a cross-sectional view of the invention in its locked position where the water can flow continuously.

FIGS. 2 to 4 illustrate the working conditions of the invention. In the closed condition (FIG. 2), the rod tip (22) of the throttle pin (2) is located below the aperture (14). The steel ball (4) urges against the seal ring (5) due to water pressure. The control lever (3) is located at the lowest closed position. As the control lever (3) is moved from its lowest closed position to the intermediate, open position (FIG. 3) where the water can be admitted, the steel ball (4) is pushed away from the aperture (14) by the rod tip (22) of the throttle pin (2) which rises axially. At this instant, water will enter the housing (1) through the aperture (14), and flows out in spray form through the diffusion ring (6) . When the hand is released from the control lever (3), the throttle pin (2) will fall, and the steel ball (4), which is subject to water pressure, will immediately return to the position where it urges the aperture (14). As the control lever (3) is moved manually from its lowest closed position to its fixed open position (FIG. 4) where it engages the lock slot (18), the control lever (3) will be secured within the locking slot (18), and due to the locking effect of the slot, the aperture (14) is kept open to allow continuous water flow even the hand is released. As the double spring plate (31) of the control lever (3) is compressed and withdrawn along the locking slot (18) such that the spring plate (31) disengages the slot (18), the throttle pin (2) drops and the steel ball (4), under the action of water pressure, returns to the position where it closes the aperture (14).

By the aforementioned arrangement, this invention solves the water discharge problems normally found in existing faucets. It should be understood that the embodiment described herein is for illustrative purpose only and that various modifications or changes in light thereof will be suggested to those skilled in the art and are to be included within the spirit and purview of this application and the scope of the appended claims.

I claim:

1. A discharge controlling device for faucet comprising:
    a housing in which the upper end thereof being threaded to form the threaded edge, the intermediate portion thereof being embossed to form the embossed portion, the internal portion thereof having a space open at one end in which the upper end thereof being defined by a partition having a central aperture, a pair of locking slots being provided at the lower edge of the housing at two locations opposite to each other;
    a throttle pin having a spherical surface at the lower end thereof, and an rod tip located at the upper end;
    a control lever shaped to be a forked double spring plate;
    a steel ball;
    a seal ring, and
    a diffusion ring having a central opening and a plurality of peripheral diffusion holes;
    the seal ring being secured at the periphery of the housing aperture, the steel ball being positioned atop the aperture, the diffusion ring being placed within the interior space of the housing such that the lower edge thereof is above the upper edges of the locking slots located at the lower edges of the housing; the throttle pin being penetrated through the central opening of the diffusion ring, the control lever being locked with one end thereof secured within one of the locking slots, and the other end thereof secured within the other locking slot such that the throttle pin is carried by the control lever and positioned in place.

2. The discharge controlling device for faucet according to claim 1, wherein the aperture being stepped in configuration to form a recessed annular groove, and the seal ring being placed in the annular groove located around the periphery of the housing aperture.

3. The discharge controlling device for faucet according to claim 1, wherein the locking slots are open and extend through the lower edge of the housing, and include a locking neck each in the interior thereof to engage the control lever.

4. The discharge controlling device for faucet according to claim 1, wherein one end of the double spring plate of the control lever is formed into a head to facilitate the compressing of the spring plate and provide locking effect.

* * * * *